(12) United States Patent
Yagisawa et al.

(10) Patent No.: US 6,941,439 B2
(45) Date of Patent: Sep. 6, 2005

(54) COMPUTER SYSTEM

(75) Inventors: Ikuya Yagisawa, Tokyo (JP); Naoto Matsunami, Hayama (JP); Yasuyuki Mimatsu, Yokohama (JP); Akihiro Mannen, Yokohama (JP); Kenji Muraoka, Odawara (JP)

(73) Assignee: Hitachi, Ltd. (JP)

( * ) Notice: Subject to any disclaimer, the term of this patent is extended or adjusted under 35 U.S.C. 154(b) by 254 days.

(21) Appl. No.: 10/282,863

(22) Filed: Oct. 28, 2002

(65) Prior Publication Data

US 2003/0225993 A1 Dec. 4, 2003

(30) Foreign Application Priority Data

May 29, 2002 (JP) ...................................... 2002-154945

(51) Int. Cl.[7] .............................................. G06F 12/00
(52) U.S. Cl. ........................ 711/202; 711/156; 711/114
(58) Field of Search ........................ 711/156, 200–221; 709/246; 707/102

(56) References Cited

U.S. PATENT DOCUMENTS

| | | | | |
|---|---|---|---|---|
| 5,530,821 | A | * | 6/1996 | Miyamoto .................. 711/203 |
| 6,272,492 | B1 | * | 8/2001 | Kay ............................ 707/10 |
| 6,567,883 | B1 | * | 5/2003 | Dahlen et al. .............. 710/315 |
| 2001/0034733 | A1 | * | 10/2001 | Prompt et al. ............. 707/102 |
| 2003/0182501 | A1 | * | 9/2003 | George et al. ............. 711/114 |
| 2004/0088432 | A1 | * | 5/2004 | Hubbard et al. ........... 709/246 |

FOREIGN PATENT DOCUMENTS

JP          06-161837          6/1994

OTHER PUBLICATIONS

Gonzalo Navarro, Proximal Nodes: A Model To Query Document Databases By Content And Structure, ACM Transactions on Information Systems, page(s) 400–435, 1997.*

David A. Patterson et al., *A Case fpr Redundant Arrays of Inexpensive Disks* (RAID) ; University of California, Berkeley, Computer Science Division, Copy right 1988, pp. 109–118.

* cited by examiner

Primary Examiner—Pierre-Michel Bataille
(74) Attorney, Agent, or Firm—Townsend and Townsend and Crew LLP

(57) ABSTRACT

An address translation server recognizes and stores a characteristic of a storage device which forms a memory area. The address translation server creates and issues a command to the storage device by recognizing an access characteristic from a host computer and taking into consideration a characteristic of a storage device to which the command is issued. In addition, the storage device provides a resource which matches a requested access characteristic. An external storage device attributes setting program is provided so that the address translation server can dynamically execute, in accordance with changes in the access status from the host computer, an instruction to change an attribute to a storage device which forms a memory area. Furthermore, the storage device incorporates an LU attribute command receiving program which is used to change the internal control for obtaining a requested attribute.

8 Claims, 7 Drawing Sheets

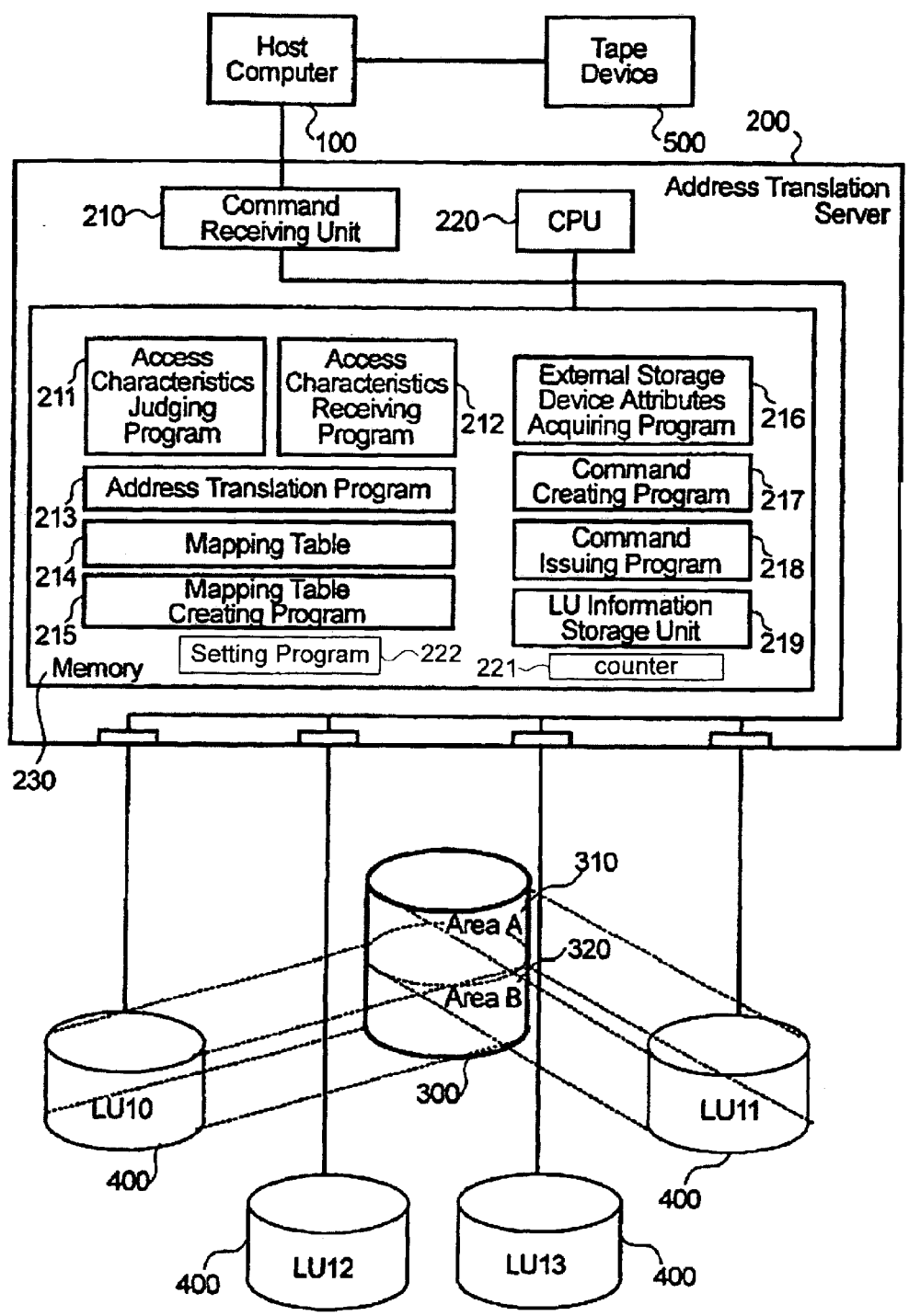

FIG.2

| Host LU | | Virtual Area | | Storage Device LU | | Storage Device Attributes | | | |
|---|---|---|---|---|---|---|---|---|---|
| LUN | LBA Range (Block Address) | Virtual Area | Virtual LBA Range (Block Address) | LUN | LBA Range (Block Address) | Seq | Rand | Relia-bility | Recognition of Command with Attributes |
| 0 | 0~199 | Area A | 0~99 | 10 | 0~99 | 4 | 3 | 4 | No |
| | | Area B | 100~199 | 11 | 0~99 | 1 | 4 | 4 | Yes |
| | | | | 12 | 0~99 | 5 | 1 | 5 | Yes |
| | | | | 13 | 0~99 | 1 | 5 | 1 | No |

FIG.3

| Storage Attributes | Evaluation |
|---|---|
| LU Number | LU10 |
| Capacity Size | 100 |
| Sequential Performance | 4 |
| Random Performance | 3 |
| Reliability | 4 |
| Recognition of Command with Attributes | No |

FIG.4

| # | Item | Description |
|---|---|---|
| 1 | Op Code | Read or Write |
| 2 | LBA (Block Address) | 0 |
| 3 | Size | 2 blocks |
| 4 | Sequential Property | Yes |
| 5 | Random Property | No |
| 6 | Reliability | 3 |

FIG.7

| Host LU | | Virtual Area | | Storage Device LU | | LU Attributes | | | |
|---|---|---|---|---|---|---|---|---|---|
| LUN | LBA Range (Block Address) | Virtual Area | Virtual LBA Range (Block Address) | LUN | LBA Range (Block Address) | Look-ahead Amount | Resident in Cache | Inhibition of Cache | Mirror |
| 0 | 0~199 | Area A | 0~99 | 10 | 0~99 | 0 | ON | ON | OFF |
|   |   | Area B | 100~199 | 11 | 0~99 | 0 | ON | ON | OFF |
|   |   |   |   | 12 | 0~99 | 0 | OFF | ON | OFF |
|   |   |   |   | 13 | 0~99 | 0 | OFF | ON | OFF |

FIG.8

| # | Item | Description |
|---|---|---|
| 1 | Op Code | Mode Select |
| 2 | LBA (Block Address) | 0 |
| 3 | Look-ahead Amount | 0 |
| 4 | Resident in Cache | ON |
| 5 | Inhibition of Cache | ON |
| 6 | Mirror | OFF |

FIG.9

| LU No. | No. of Commands | No. of Sequential Commands | Timer |
|---|---|---|---|
| 10 | 1000 | 900 | 0:00:00 |
| 11 | 2000 | 800 | 0:00:00 |
| 12 | 3000 | 800 | 0:00:00 |
| 13 | 1500 | 1000 | 0:00:00 |

FIG.10

| Cache Address | LBA | Read Cache Bit | Resident Bit |
|---|---|---|---|
| 0 | 5 | 0 | 0 |
| 1 | 6 | 0 | 0 |
| 2 | 7 | 1 | 0 |
| 3 | 8 | 1 | 0 |
| 4 | 9 | 1 | 0 |
| 5 | 0 | 0 | 1 |
| 6 | 1 | 0 | 1 |
| 7 | 2 | 0 | 1 |
| 8 | 3 | 0 | 1 |
| 9 | 4 | 0 | 1 |

COMPUTER SYSTEM

BACKGROUND OF THE INVENTION

The present invention relates to a storage device, and more particularly to a technique that virtually assigns a plurality of storage devices into one memory area and provides the area to a computer.

There is known a technique called "virtualation," which virtualizes a memory area available in a plurality of storage devices and provides the virtualized memory area as one or a plurality of virtual memory areas to a computer. A storage device is usually constructed with disk arrays. The disk array known as a Redundant Arrays of Independent Disks (RAID) and is a memory device where many disk drive devices are configured in arrays. Details of the disk array are described in: "A Case for Redundant Arrays of Inexpensive Disks (RAID)."

In addition, Japanese Patent Laid-open No. 6-161837 discloses a technique wherein, at the time of assigning a file to a user of a memory area available in a memory device, a storage device will automatically select a memory area that is optimum for assigning files, based on file attributes or file information such as type of space assignment.

SUMMARY OF THE INVENTION

If a single storage device is used in a computer system, the user of the system can use a storage device that is suitable for the application of the data to be used. However, if a virtualization technique is introduced into the system, the user cannot specify and use a storage device that is suitable for the application of data to be used, since virtual memory areas, which are formed by a plurality of storage devices, are used.

In addition, even if a storage device that is suitable for the application of data is assigned to the user in a specified manner, the computer system concerned cannot deal with changes if the application of data used by the user varies.

To solve the above-stated problems with the present invention, an address translation server that realizes the virtualization recognizes and stores characteristics of a storage device that forms a storage pool. Further, the address translation server recognizes access characteristics from a host computer and creates and issues a command to the storage device, in view of the characteristics of the storage device to which the command is issued. In addition, the storage device provides a resource that matches the access characteristics required.

Furthermore, in order to solve the above-described problems, the present invention incorporates an external-storage-device attributes acquisition program where an address translation server that realizes the virtualization can dynamically execute an attribute change instruction to a storage device which forms a storage pool, according to changes in the access status from the host computer. In addition, the storage device changes the internal control so that the attributes an be provided as required.

BRIEF DESCRIPTION OF THE DRAWINGS

FIG. 1 is a system configuration diagram according to a first embodiment of the present invention;

FIG. 2 is an explanatory diagram of a mapping table according to the first embodiment of the present invention;

FIG. 3 is an explanatory diagram of storage LU information according to the first embodiment of the present invention;

FIG. 4 is an explanatory diagram of commands according to the first embodiment of the present invention;

FIG. 7 is an explanatory diagram of a mapping table according to a second embodiment of the present invention;

FIG. 8 is an explanatory diagram of commands according to the second embodiment of the present invention;

FIG. 9 is an explanatory diagram of an access characteristics counter according to the second embodiment of the present invention;

FIG. 10 is an explanatory diagram of a cache management table according to the second embodiment of the present invention.

DESCRIPTION OF THE PREFERRED EMBODIMENTS

Figure 5:
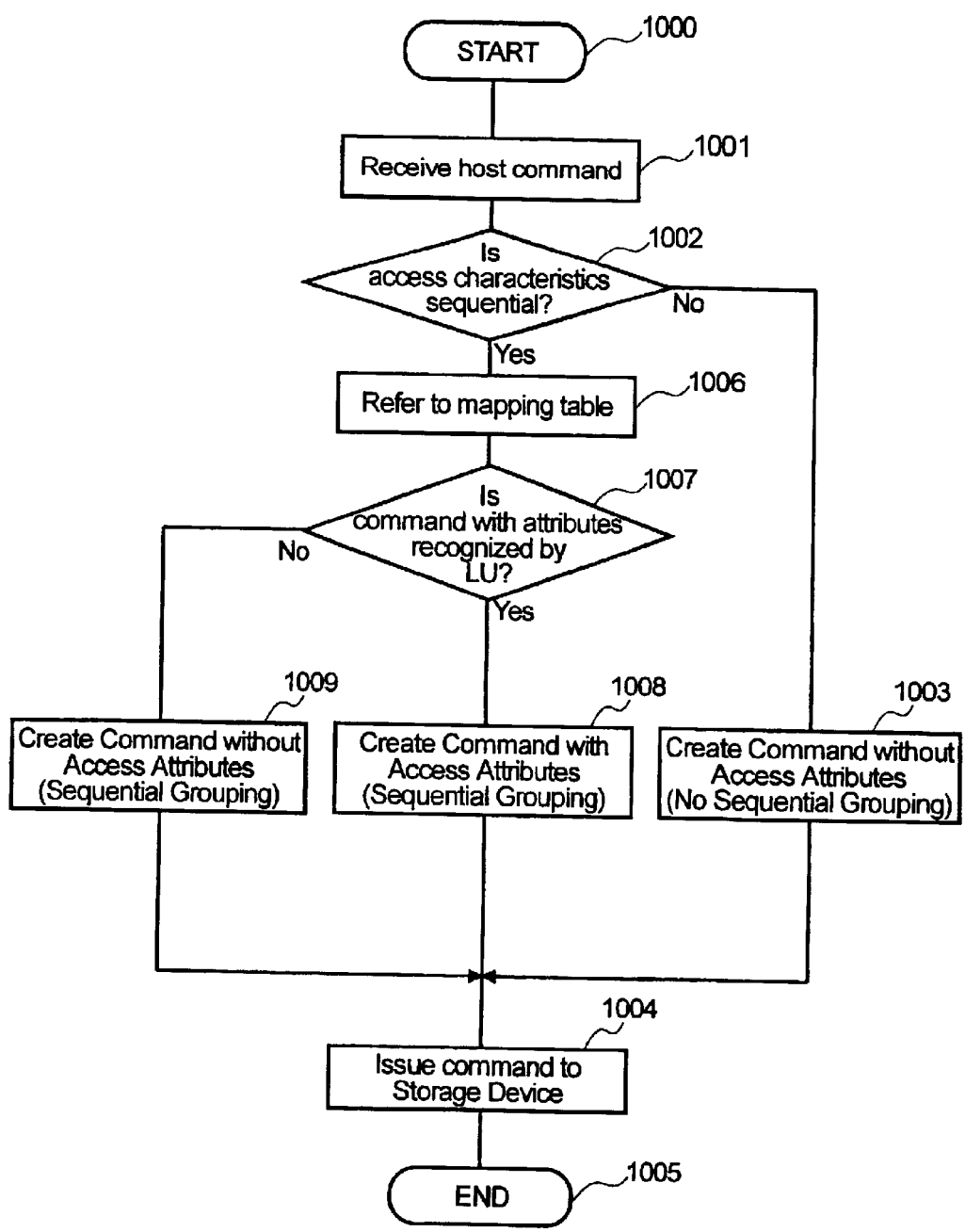
FIG. 5 is a flow chart of address translation and a command issuing operation according to the first embodiment of the present invention.

FIG. 1 is a diagram showing a first embodiment of a computer system wherein the present invention is applied. In FIG. 1, the computer system comprises a host computer 100 (hereinafter referred to as the "host 100"), an address translation computer 200 (hereinafter referred to as the "address translation server 200"), a plurality of storage devices 400, and a tape device 500. It should be noted that the storage device 400 may be either a single disk device, or a storage device system, which is a combination of a plurality of disk devices, such as a RAID and a control device. In addition, the plurality of storage devices 400 may be either a combination of the same storage devices or a combination of different storage devices.

A memory area that is available in each of the storage devices 400 is called a logical unit (LU). Hereinafter, the LUs of the plurality of storage devices 400 will be referred to as LU10, LU11, LU12 and LU13, respectively. It should be noted, however, the LU available in the storage device 400 may either be one that corresponds one-on-one to a disk device available in the storage devices 400, or one that corresponds to a memory area that extends over the plurality of disk devices available in the storage devices 400.

In the present invention, an attribute of an LU available in each of the storage devices 400 is recognized by the address translation server 200. The attribute of the LU may include not only functions that are realized by the storage device 400, but basic characteristics of the storage device 400, such as access performance from the host 100 and reliability. An example of the functions might include the one to enable/disable the recognition of special commands issued by the address translation server 200.

The tape device 500 is connected to the host 100 and is used to back up data.

The host 100 and the address translation server 200, and likewise, the address translation server 200 and the storage device 400, are respectively connected to each other via a communication line. The communication line used may be any of those lines, for example, where IP protocols are used, or where fiber channel protocols are used.

LU_300 is a virtual memory area that is to be recognized by the host 100, and has an area A_310 and an area B_320. In the first embodiment, area A_310 is associated with LU10, while area B_320 is associated with LU11. Although area A_310 and area B_320 are memory areas available in respective storage devices, which are practically different each other, LU_300 is recognized as a series of logical units by the host 100.

The address translation server 200 has a CPU 220, a memory 230, a command receiving unit 210, which receives commands from the host 100, an access characteristics judging program 211, which judges access characteristics of commands from the host 100, an access characteristics receiving program 212, which receives access characteristics information that is included in commands from the host 100, an address translation program 213, a mapping table 214, a mapping table creating program 215, an external storage device attributes acquisition program 216, a command creating program 217, a command issuing program 218 and an LU information storage unit 219. The CPU 220 executes the above-described programs.

The address translation program 213 is executed when the address of LU_300 designated by the host 100 is translated into addresses showing LU10, LU11, LU12 and LU13. In the mapping table 214, relationships with LU_300, LUs 10 to 13 and attributes of LUs 10 to 13 are registered. The mapping table creating program 215 is executed, according to the configuration of the storage device 400 that the computer system has, at the time the mapping table 214 is created.

The external-storage-device attributes acquisition program 216 is executed when information indicating attributes of the storage device 400 is acquired from the storage device. The command creating program 217 is executed when commands, such as a command to write data to the storage device 400, are created.

FIG. 2 is a diagram showing an example of the mapping table 214. The mapping table 214 registers an LU number (LUN) and a logical block address (LBA) of the virtual host LU_300 that can be recognized by the host 100, the virtual LBAs of area A_310 and area B_320, which are virtual areas, as well as the LUNs, LBAs and attributes of LU10, LU11, LU12 and LU13, which are memory areas of respective storage devices 400. In addition, the mapping table 214 records the relationship among various registered items.

Attributes of the storage device 400 include sequential access performance, random access performance, evaluation of reliability, the function to enable/disable recognition of commands with attributes, etc. of the storage device 400. In the first embodiment of the present invention, evaluation values for sequential access performance, random access performance and reliability are indicated in five steps, and a higher evaluation is given to those steps that have a higher number.

FIG. 3 is a diagram showing an example of storage LU information of respective storage devices 400 that is obtained by the address translation server 200 through the execution of the external storage device attributes acquisition program 216. The storage LU information includes storage attributes and evaluation values thereof The storage attributes include LU number, capacity, sequential access performance, random access performance, reliability and the function to enable/disable the recognition of commands with attributes. Depending on the storage LU information to be obtained from the storage device 400, some values for information of attributes shown in FIG. 3 are not set.

FIG. 4 is a diagram showing the contents of commands issued by the host 100 and the address translation server 200. Of the items shown in FIG. 4, those corresponding to #1 to #3 are contents that are included in typical commands to be used for reading and writing. More specifically, operation details such as read/write are set to the item "Op codes". Moreover, LBA values are set to the item "LBA", and information indicating size is set to the item "Size."

For the items corresponding to #4 to #6, information showing access characteristics is set. For the item "sequential property", information that shows whether the command for sequential data access is set. For the item "random property", information that shows whether the command for random access is set. For the item "reliability", information that shows what level of reliability is necessary for the data is set.

Hereinafter, how to create mapping table 214 is described.

At the time of the initial start up of the system, the address translation server 200 executes the mapping table creating program 215 to retrieve the storage devices 400, which are connected to the address translation server 200. Thereafter, the address translation server 200 executes the external-storage-device attributes acquisition program 216 to acquire LU information from the storage device 400, and stores it in the LU information storage unit 219.

Then, the address translation server 200 issues commands such as ModeSense to the storage device 400 to acquire the storage LU information. Thereafter, the address translation server 200 executes the mapping table creating program 215, based on the storage LU information thus acquired, to record values for the storage device LU and storage device attributes in respective items of the mapping table 214.

It should be noted that, depending on storage LU information, there are items to which the storage device 400 may not respond. If this is the case, the address translation server 200 executes the external-storage-device attributes acquisition program 216 to issue read/write commands to the storage device 400 and measures performance values according to access characteristics. Thereafter, the address translation server 200 records values in items of storage device attributes based on the measurements.

In addition, upon receiving the request for creating an LU from the host 100, the address translation server 200 executes the mapping table, creating program 215 to form a host LU by combining the available LUs of storage devices, based on storage attribute values such as the storage capacity, performance, and reliability of the LUs thus requested. At the time the creation of an LU is requested, the storage capacity and the storage attribute values may be sent to the address translation server 200 from the host 100.

FIG. 2 shows that a LUN0, which is a certain LU_300, has a storage capacity of 200 blocks. LUN_0 consists of an area A_310 and an area B_320, and, further, area A_310 comprises LBA_0 to LBA_99 of LU10 and area B_320 comprises LBA 0 to LBA_99 of LU11. Both LU10 and LU11 are associated with storage device attributes.

FIG. 5 is a flow chart showing processing of the address translation and the issuance of commands in the address translation server 200. In FIG. 5, sequential access is assumed as an access characteristic, but any other characteristics may be used.

First, the address translation server 200 receives a command issued by the host 100 at the command receiving unit 210 (step 1001). The address translation server 200 executes the access characteristics judging program 211 to judge, based on a plurality of commands received, whether the access characteristic is sequential or not. There are various methods for the judgment of the access characteristic, and the judgment can easily be made with a known method. Therefore, the description of the methods has been omitted (step 1002).

If the characteristic of a received command is not sequential, the address translation server 200 creates a command which does not have any access attributes (step 1003), and issues a command to the storage device 400 (step 1004). Otherwise, if the characteristic of a received command is sequential, the address translation server 200 refers to the mapping table 214 (step 1006), and judges whether or not the LU of the storage device 400 which corresponds to the command can recognize a command with attributes (step 1007).

If the storage device 400 can recognize a command with attributes, the address translation server 200 creates a command to which an access attribute showing a sequential characteristic is added (step 1008), and issues a command to the storage device 400 (step 1004). It should be noted that in order to add an attribute of sequential access to a command, a value which indicates "Yes" is filled in in the description column for "sequential property" of the command. In addition, a plurality of commands that are judged to be sequential maybe put together for a single command.

Further, in step 1007, if it is judged that the storage device 400 cannot recognize a command with attributes, the address translation server 200 creates a command that does not have any access attributes (step 1009), and issues a command to the storage device 400. In this case, a plurality of commands that are judged to be sequential may be put together for a single command (step 1004).

It should be noted, however, that if an access characteristic is recorded in the command received from the host 100, the address translation server 200 may, in step 1002, judge the sequential characteristic of the command by using the access characteristics receiving program 212 instead of using the access characteristics judging program 211.

For example, a host 100 that issues a lot of random access may be assumed to be used, and further, a case where data that are stored in the storage device 400 are backed up in the tape device 500 may be assumed. Efficient processing of commands maybe executed if the address translation server 200 instructs the storage device 400 that random access should be applied except for backup processing and that sequential access should be applied during backup processing, since the storage device 400 is able to recognize access characteristics of commands received in advance.

For a case where a storage device includes a disk device and a cache, if the command received from the address translation server 200 is recognized to be sequential access, then it is possible to execute staging to the cache in advance by issuing commands that are expected in advance to be sequential to the disk device, and then data can be directly transferred from the cache in the phase where access to the staging-completed address is provided from the address translation server 200. This makes it possible to make the command processing more efficient. The staging to a cache, which will be executed in advance, can easily be realized with a known technique.

For an access characteristic to be recorded in a command that is received from the host 100, an item such as reliability may be used in addition to performance. The number of access characteristics to be recorded in a command is at least one.

According to the first embodiment of the present invention, a storage device that matches an application can be assigned to the host 100 by allowing the address translation server 200 to keep attributes of the storage device 400 in a mapping table 214.

Furthermore, the address translation server 200 can improve the access performance by creating and issuing a command to the storage device, after recognizing the access characteristic from the host 100, while taking into consideration the characteristic of the storage device to which the command is issued.

Next, a system configuration of a second embodiment according to the present invention is described. Differences from the system shown in FIG. 1 are as follows: An address translation server 200 incorporates, in addition to the components shown in FIG. 1, an external storage device attributes setting program 222, which sets an attribute to a storage device 400, and an access characteristics counter 221, which counts the frequency of a command that is received from the host 100 and has a certain access characteristic. The access characteristic includes performance values such as the number of I/Os per unit time and the data transfer volume per unit time, in addition to the sequential property and the local property that are determined by an address and a size specified by a command.

The address translation server 200 judges the access characteristic by executing an access characteristics judging program 211. The address translation server 200 executes a command creating program 217 to create a ModeSelect command, which is used to instruct a change in an LU attribute to the storage device 400.

Figure 6:
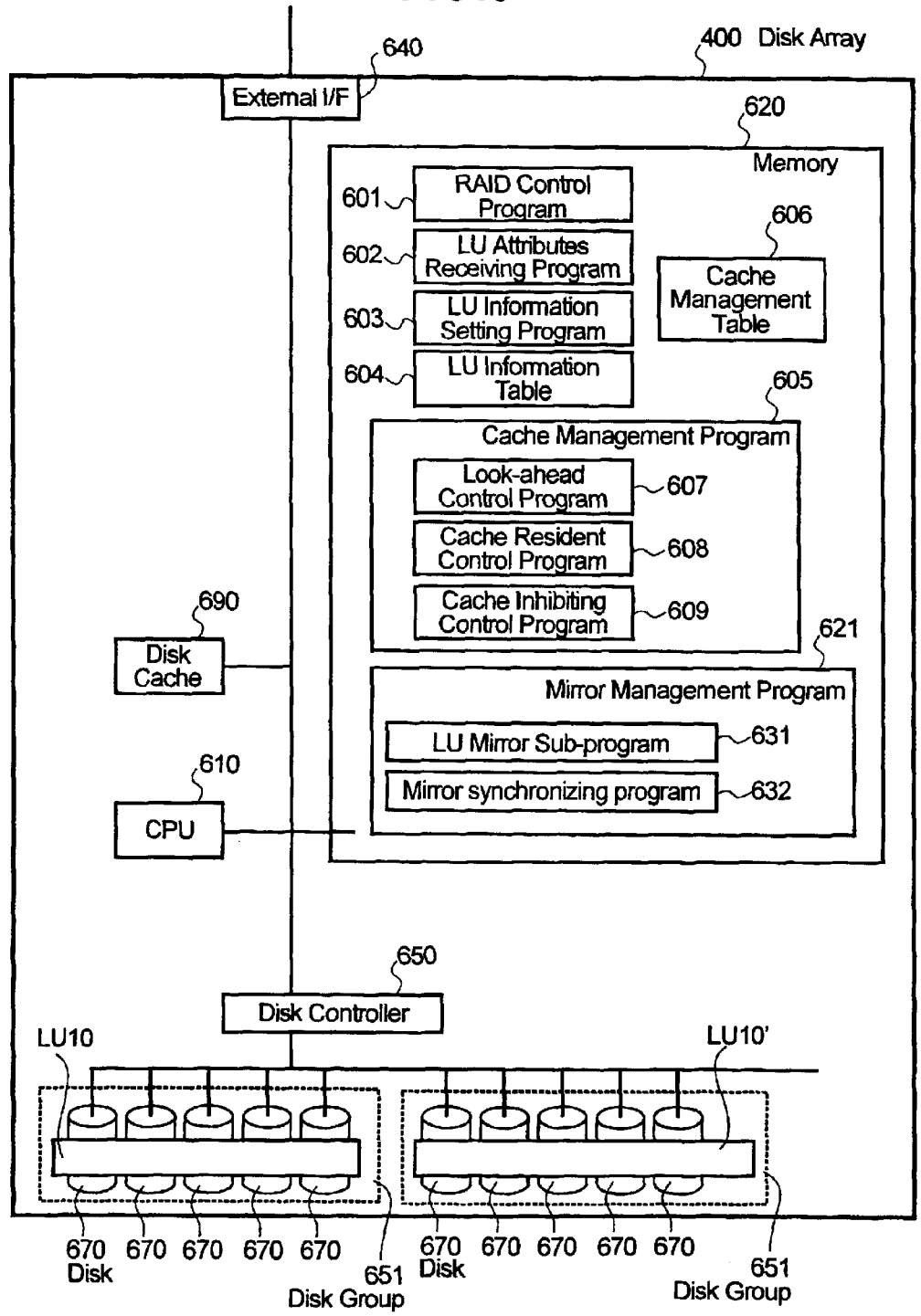
FIG. 6 is a structural diagram of Disk Array 400.

FIG. 6 is a diagram showing an exemplary configuration of the storage device 400 according to the first embodiment and the second embodiment, as well, more specifically of a disk array 400. LU10 is theoretically built within the storage device 400 shown in FIG. 6. The disk array 400 comprises a disk controller 650, a disk group 651, a CPU 610, a memory 620, a disk cache 690 and an external interface 640. The disk group 651 incorporates a plurality of disks 670.

In the memory 620, a RAID control program 601, a cache management program 605, and a mirror management program 621 are stored. These programs are executed by the CPU 610. In addition, the memory 620 incorporates a cache management table 606 in which a bit map for the cache management will be stored.

The RAID control program 601 is executed when the CPU 610 controls a disk array. Each of the disk groups 651 has a RAID5, or a redundant configuration using parity, provided that the number of disks in each of the disk groups 651 as well as the RAID configuration of each disk groups 651 maybe of another configuration such as a RAID1, etc. Data that is temporarily stored on disk 670 is stored in the disk cache 690. An external I/F 640 interfaces with other devices, and in the second embodiment of the present invention, it constitutes an interface with the address translation server 200.

Access to a memory area in the disk group 651 is made as a logical unit (LU) as determined in the SCSI standards. LUs belonging to disk groups 651 are LU10 and LU10', respectively. In the second embodiment of the present invention, the same data is stored in LU10 and LU10' (hereinafter referred to as "mirroring"). LU10 is the mirror-source LU in which original data are stored, and LU10' is the mirror-destination LU in which copies of the original data are to be stored. In case these LUs are not managed under mirroring status, each LU will be handled as an independent LU.

The mirror management program 621 of the disk array 400 incorporates an LU mirror subprogram 631 and a mirror synchronizing subprogram 632. The LU mirror subprogram 631 is executed by the CPU 610 when an update for a particular LU is applied also to an another LU that is specified in advance and mirroring is performed to write the same data in the two LUs. In addition, the disk array 400 executes reading from an LU on either of the two LUs, thus reducing the load on a disk.

It should be noted that the disk array 400 performs the mirroring of LU10 to LU10', but it is also possible to limit the data writing only to LU10, as is the normal case. The mirror synchronizing program 632 is a program executed by the CPU 610 when an initial copy is carried out to the mirror-destination LU from the mirror-source LU when the disc array 400 performs the mirroring.

The cache management program 605 is used as a subprogram, and it incorporates a look-ahead control program 607, a cache resident control program 608 and a cache inhibition control program 609. The look-ahead control program 607 is executed when the CPU 610 performs a look-ahead control. The cache resident program 608 is executed when the CPU 610 controls the LU resident on the disk cache 690. The cache inhibition control program 609 is executed when the CPU 610 performs a control to inhibit caching to the disk cache 690.

The disk array 400 reads data other than those requested from the disk group 651 to the disk cache 690 by executing the look-ahead control program 607, thus forecasting data to be read out in advance for a command requested by the address translation server. In addition, the disk array 400 executes the cache resident control program 608 to allow data included in an LU or part of an LU to be constantly stored in the disk cache 690. The LU to be constantly stored in the disk cache 690 includes, for example, an LU that is requested to respond to the address translation server 200 at a high speed.

Further, the LU attributes command receiving program 602 is executed by the CPU 610 when the ModeSelect command, which is an LU attributes command from the address translation server 200, is received. The LU information setting program 603 is executed when an LU attribute is set based on the Mode Select command, which is the LU attributes command thus received. LU attributes information is stored in an LU information table 604. An LU information table 604 exists for each LU.

FIG. 7 is a diagram showing an example of the mapping table 214 according to the second embodiment of the present invention. Differences from the first embodiment are that the columns under the LU attributes include "look-ahead amount", "resident in cache", "inhibition of cache" and "mirror." In the column "look-ahead amount", the number of logical blocks in which a look-ahead is executed is stored. It should be noted that the value to be stored may be not the number of blocks, but a unit showing other data amounts. In columns "resident in cache", "inhibition of cache" and "mirror," such information as ON, which indicates that functions corresponding to the respective items are enabled, or OFF, which indicates that those functions are disabled is stored.

FIG. 8 is a diagram showing an example of the Mode-Select command which is issued by the address translation server 200 to the disk array 400, according to the second embodiment of the present invention. For items #1 and #2, the same information as that of the first embodiment is set. Information showing the look-ahead amount, the cache resident, the cache inhibition and the mirroring, which correspond to attributes to be stored in the mapping table 214, are set for the respective items #3 to #6.

FIG. 9 is a diagram showing an example of an access characteristics counter 221 according to the second embodiment of the present invention. In the access characteristics counter 221, the number of commands to be issued to an LU corresponding to an LU number, the number of commands with sequential property, and a timer value are stored. The timer value shows the period of time stored for operating the counter.

For example, in a case where the disk array 400 examines a sequential property of access, the disk array 400 calculates the percentage of associated sequential commands by comparing the number of commands for the LU within the time period set for the timer value with that of sequential commands, thus judging the sequential property of the access.

Further, in a case where the disk array 400 examines a performance value requested by the host 100 using the access characteristics counter 221, the disk array 400 verifies the number of I/Os within a certain period of time set for the timer value.

FIG. 10 is a diagram showing the contents of the cache management table 606. In the cache management table 606 are stored a cache address showing an address in the disk cache 690, an address of LBA corresponding to the cache address, a read cache hit bit showing if a caching to an area corresponding to the cache address is inhibited or not, and a resident bit showing if data in an area corresponding to the cache address is cache resident data or not.

Figure 11:
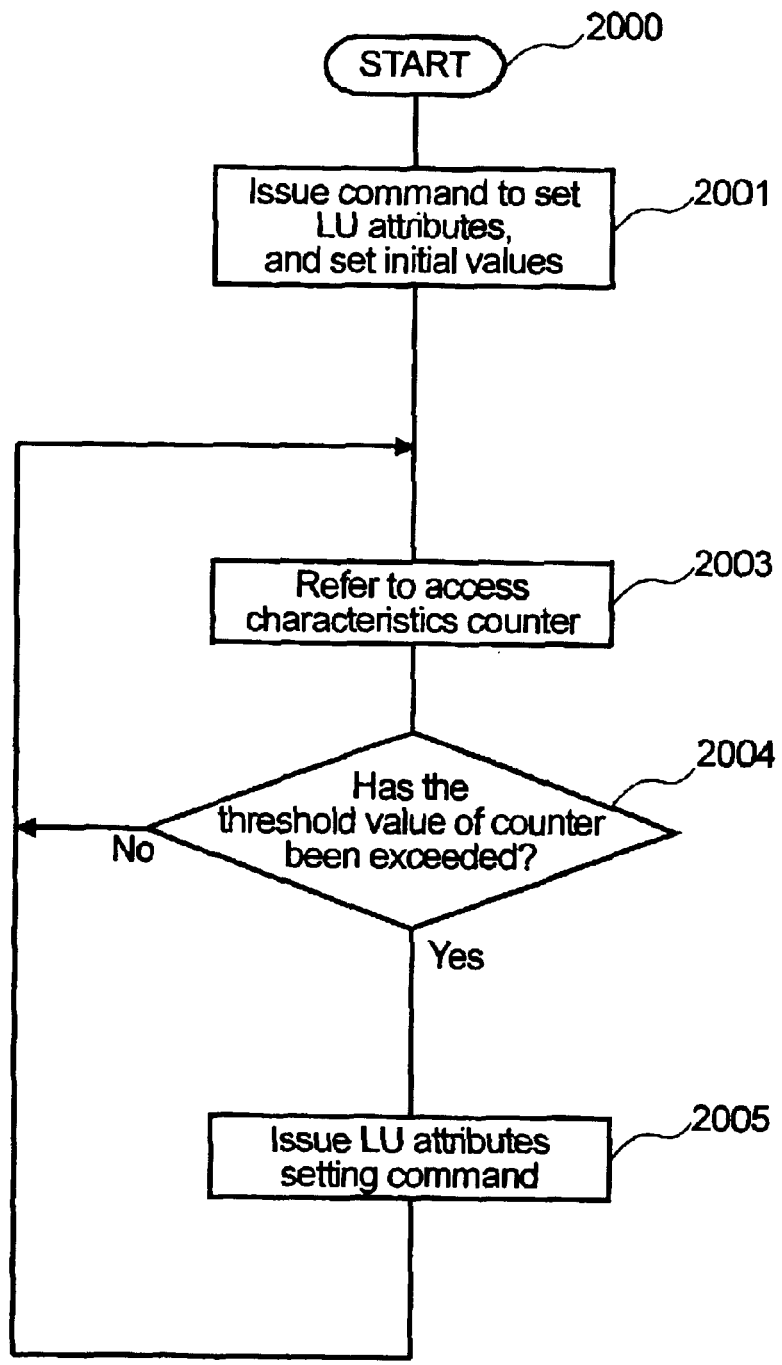
FIG. 11 is a flow chart of LU attributes designating the command issuing operation according to the second embodiment of the present invention.

FIG. 11 is a diagram showing an operation of the address translation server 200 according to the second embodiment of the present invention. In FIG. 11, a case is assumed, due to the access characteristic of the host 100, where random access without a sequential property occurs frequently during the initial stage, and, subsequently, access with a sequential property occurs frequently.

For example, when the host 100 uses the address translation server 200 as storage for a database, random access will occur in typical database accessing. However, in a case where the host 100 backs up the data to tape device 500 or the like, it is necessary for the host 100 to perform an operation to read sequential addresses from the storage device it is using, thus making the access sequential First, the address translation server 200 executes the external storage device attributes setting program 222 to create the ModeSelect command which is an LU attributes setting command. Then, by using the command issuing program 218, the address translation server 200 issues the ModeSelect command to the disk array 400. For the command to be generated at this time, the values to be set by the command are determined to be zero (0) for the look-ahead amount, ON for the cache resident, OFF for the cache inhibition, and OFF for the mirroring, assuming that random access will occur frequently. If the capacity of the disk cache 690 is taken into consideration, the cache resident may be set as OFF.

It should be noted that the disk array 400 executes the LU attributes command receiving program 602 to receive the ModeSelect command thus issued. Thereafter, the disk array 400 executes the LU information setting program 603 to set the LU attributes information included in the ModeSelect command thus received to the LU information table 604 (step 2001).

The address translation server 200 monitors the commands from the host 100, and counts the access characteristics to the access characteristics counter 221. In the second embodiment, counting is done to determine whether access has a sequential property. The method judging sequential performance may be the same as that for the first embodiment. It should be noted that counting to the counter is not shown in FIG. 11 since the attribution is executed without the synchronization with steps 2001 and thereafter.

The address translation server 200 refers to the access characteristics counter 221 from time to time (step 2003), and examines, with regard to the volume of commands received from the host 100, whether sequential access has exceeded a certain level of threshold value (step 2004). If sequential access has not exceeded the threshold value, the address translation server 200 executes the processing of step 2003.

If sequential access has exceeded the threshold value, the address translation server 200 executes the external storage device attributes setting program 222 to create the Mode-Select command, which is an LU attributes setting command. Then, the address translation server 200 executes the command issuing program 218 to issue the ModeSelect command to the disk array 400.

The ModeSelect command to be created at this time is a value obtained by assuming that sequential access occurs frequently; the look-ahead amount may be, for example, 32 blocks, and the cache inhibition may be ON. The reason why the cache inhibition may be set as ON, that is, why no caching is made, is that it is highly likely that the data requested may have been deleted from the disk cache 690 before the data could be reused, since accesses from the host 100 been sequential (step 2005). The address translation server 200 executes the processing of the step 2003 after issuing the command.

In addition to the example of sequential access described in FIG. 11, the address translation server 200 can count, in similar processing procedures, changes in access characteristics by using the access characteristics counter 221, and issue, depending on the status, a ModeSelect command, which is an LU attributes setting command, to the disk array 400. For example, in a case where the number of I/Os per unit time from the host 100 has increased and the capacity of disk devices currently in operation is insufficient to handle such increases, it is possible to set the item "mirror" to ON to increase the number of disk devices being used for the I/Os.

In addition, when the address translation server 200 recognizes the access characteristic of a command received from the host 100, the recognition may be performed by transmitting a command with attributes from the host 100, as is the case with the flow of FIG. 5 described for the first embodiment. Next, operations of the disk array 400 which receives a ModeSelect command that is an LU attributes setting command will be described.

The disk array 400 receives a ModeSelect command, which is an LU attributes setting command, by executing the LU attributes command receiving program 602. Thereafter, the disk array 400 executes the LU information setting program 603 to store contents included in the LU attributes setting command in the LU information table 604. Then, the disk array 400 determines control methods for the look-ahead amount, the cache resident, the cache inhibition and the mirroring functions respectively, according to the information stored in the LU information table 604.

In case the look-ahead amount of the LU information table 604 is not equivalent to zero (0), responding to the command requested by the address translation server 200 and based on the look-ahead amount set in the LU information table 604, the disk array 400 reads data covering the look-ahead amount thus set from the disk group 651 to the disk cache 690. If the cache resident information of the LU information table 604 is ON, the disk array 400 controls the disk cache 690 to make the LU concerned or a part of the LU resident in the disk cache 690. If the information is OFF, the disk array 400 controls the disk cache 690 make it non-resident.

More specifically, the disk array 400 executes the RAID control program 601 to refer to the cache management table 606, and judges if an address of LBA, which is stored in association with a cache address showing a position within the disk cache 690, is an address showing the position of data that should be resident in the cache. If cache inhibition information in the LU information table 604 is ON, the disk array 400 controls the disk cache 690 to inhibit the caching of an LU or apart of an LU in the disk cache 690. If the information is OFF, the disk array 400 controls and does not inhibit the caching.

More specifically, the disk array 400 executes the RAID control program 601 to refer to the cache management table 606, and the disk array 400 judges whether or not the LBA address stored in association with a cache address showing a position in the disk cache 690 is the address of data whose caching should be inhibited. Further, if mirroring information in the LU information table 604 is ON, the disk array 400 executes the mirror management program 621 to perform a mirroring of access to LU10 over to LU10'.

More specifically, the disk array 400 first executes the mirror synchronizing program 632 to copy LU10 to LU10'. Thereafter, the disk array 400 performs the mirroring of access to LU10 by using the LU mirror subprogram 631. In a case where loads for random access become large, the disk array 400 can improve the value of reading performance by increasing the number of disks based on an instruction from the address translation server 200, as a result of setting the mirror information in the LU information table 604 ON to change it to the mirror attribute.

It should be noted that, in the second embodiment, the performance value of the disk array 400 is changed by performing the mirroring, but an another method may be used to change the performance value of the disk array 400, for example, by changing the RAID level for LU10, or by adding disk devices in a RAID configuration. In addition, the mirroring may be a multiple mirroring, for example, a triple mirroring or greater.

According to the second embodiment of the present invention, the disk array 400 can respond adequately to an access request from the host 100 when the address translation server 200 can dynamically designate attributes that are necessary for the disk array 400. Further, in the second embodiment, in a case, for example, where the number of commands issued by the host 100 has increased along with an increased number of clients, the disk array 400 can increase the number of disk devices to be used for processing based on an instruction from the address translation server 200, thus enabling response to requests from the host 100.

As described above, according to the present invention, an address translation server which realizes virtualization can assign a storage device that matches an intended application to a host computer. Furthermore, the use of the address translation server can improve the access performance of the whole system.

What is claimed is:

1. A system for storing data comprising:
   a plurality of disk array systems (400 in FIGS. 1 and 6), each of which comprises plural disks (670 in FIG. 6) and a processor (610 in FIG. 6) controlling the plural disks; and an address translation server (200 in FIG. 1) coupled to each of the plurality of disk array systems and a host computer (100 in FIG. 1), wherein the address translation server includes a mapping table (214) which stores a correspondence between a virtual address designated by the host computer and a block address sent to a disk array system and which stores information indicating whether or not the disk array system having a storage area indicated by the corresponding block address can process a command having an associated attribute, wherein the address translation server is configured to:

receive a first command from a host computer (FIG. 5 step 1001), the first command having an associated first attribute;

convert a virtual address included in the received command to a block address based on the mapping table;

determine whether or not a disk array system having a storage area indicated by the block address can process a command that is associated with an attribute based on the mapping table (FIG. 5 step 1007);

if the disk array system can process a command having an associated attribute (FIG. 5 step 1008), then create a second command that is associated with a second attribute; and send the second command to the disk array system (FIG. 5 step 1004), the second attribute being based on the first attribute.

2. A system for storing data according to claim 1, wherein the first command is a command including information indicating sequential access characteristics, and the address translation server is further configured to determine whether or not the first command requests a sequential access (FIG. 5 step 1002), and if the first command requests a sequential access to determine whether or not a disk array system having a storage area indicated by the block address can process a command that is associated with an attribute.

3. A system for storing data according to claim 2, wherein the first command includes information indicating access characteristics, and the address translation server is configured to check whether or not the first command host computer requests a sequential access based on the information included in the first command.

4. A system for storing data according to claim 2, wherein the address translation server is further coupled to a tape device, and the address translation server is further configured to send the second command including information indicating sequential access characteristic when data stored in the disk array system is backed up on the tape device.

5. A method for storing data comprising:

receiving a first command from a host computer;

translating an address indicated in the first command to a block-address, the block address identifying an area of storage in a disk array system;

if the first command is associated with an attribute, then determining whether the disk array system provides a command that corresponds to the first command and that can be invoked with the attribute;

if the disk array system provides a command that corresponds to the first command and that can be invoked with the attribute, then generating a second command which corresponds to the first command and which includes the attribute, and sending the second command to the disk array system; and if the disk array system does not provide a command that corresponds to the first command and that can be invoked with the attribute, then generating a third command which corresponds to the first command and which does not include the attribute, and sending the third command to the disk array system.

6. A method for storing data according to claim 5, wherein the first command is a command including information indicating sequential access characteristics, the further comprising determining whether or not the first command requests a sequential access, and if the first command requests a sequential access, then determining whether or not a disk array system having a storage area indicated by the block address can process a command that is associated with an attribute.

7. A method for storing data according to claim 6, wherein the first command includes information indicating access characteristics, the method further comprising determining whether, or not the first command host computer requests a sequential access based on the information included in the first command.

8. A method for storing data according to claim 6, wherein the address translation server is further coupled to a tape device, the method further comprising sending the second command including information indicating sequential access characteristic when data stored in the disk array system is backed up on the tape device.

* * * * *